United States Patent
Lin et al.

(10) Patent No.: US 7,391,807 B2
(45) Date of Patent: Jun. 24, 2008

(54) VIDEO TRANSCODING OF SCALABLE MULTI-LAYER VIDEOS TO SINGLE LAYER VIDEO

(75) Inventors: Yao-Chung Lin, HsinChu (TW); Chung-Neng Wang, Ta Shu Township Kaohsiung County (TW); Tihao Chiang, Fremont, CA (US); Anthony Vetro, Short Hills, NJ (US); Huifang Sun, Cranbury, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 138 days.

(21) Appl. No.: 10/128,758

(22) Filed: Apr. 24, 2002

(65) Prior Publication Data
US 2003/0202579 A1 Oct. 30, 2003

(51) Int. Cl.
*H04N 7/18* (2006.01)
(52) U.S. Cl. .............................. 375/240.03; 375/240.04
(58) Field of Classification Search ............ 375/240.01, 375/240.03–240.08, 240.12, 240.16, 240.2, 375/240.23, 240.24, 240.25; 348/42; 370/230; 382/239; *H04N 7/12*
See application file for complete search history.

(56) References Cited

U.S. PATENT DOCUMENTS

| | | | | |
|---|---|---|---|---|
| 5,623,312 A | * | 4/1997 | Yan et al. ................ | 375/240.03 |
| 6,043,838 A | * | 3/2000 | Chen ............................ | 348/42 |
| 6,263,022 B1 | | 7/2001 | Chen et al. ............. | 375/240.03 |
| 6,519,285 B2 | * | 2/2003 | Yamaguchi et al. .... | 375/240.12 |
| 6,785,334 B2 | * | 8/2004 | van der Schaar et al. ..................... | 375/240.16 |
| 6,920,179 B1 | * | 7/2005 | Anand et al. ........... | 375/240.25 |
| 2002/0034248 A1 | * | 3/2002 | Chen ..................... | 375/240.08 |
| 2003/0058931 A1 | * | 3/2003 | Zhang et al. ........... | 375/240.01 |
| 2003/0058936 A1 | * | 3/2003 | Peng et al. ............. | 375/240.03 |
| 2003/0081673 A1 | * | 5/2003 | Peng et al. ............... | 375/240.2 |
| 2003/0118097 A1 | * | 6/2003 | Chen et al. ............... | 375/240.2 |
| 2003/0142744 A1 | * | 7/2003 | Wu et al. ............... | 375/240.03 |
| 2004/0071083 A1 | * | 4/2004 | Li et al. ...................... | 370/230 |
| 2004/0264791 A1 | * | 12/2004 | Jiang et al. .................. | 382/239 |

OTHER PUBLICATIONS

Assuncao et al., "*A frequency domain video transcoder for dynamic bit-rate reduction of MPEG-2 bitstreams,*" IEEE Transactions on Circuits and Systems for Video Technology, pp. 953-967, 1998.

* cited by examiner

*Primary Examiner*—Anand Rao
(74) *Attorney, Agent, or Firm*—Dirk Brinkman; Clifton D. Mueller; Gene V. Vinokur

(57) ABSTRACT

A method transcodes a compressed multi-layer video bitstream that includes a base layer bitstream and an enhancement layer bitstream. The base and enhancement layers are first partially decoded, and then the partially decoded signals are combined with a motion compensated signal yielding a combined signal. The combined signal is quantized into an output signal according to a quantization parameter, and the output signal is variable length encoded as a single layer bitstream. In a preprocessing step, the enhancement layer can be truncated according to rate control constraint, and the same constraints can also be used during the quantization.

8 Claims, 9 Drawing Sheets

VIDEO TRANSCODING OF SCALABLE MULTI-LAYER VIDEOS TO SINGLE LAYER VIDEO

FIELD OF THE INVENTION

This invention relates generally to the field of video transcoding, and more particularly to the transcoding of scalable multi-layer videos to single layer videos.

BACKGROUND OF THE INVENTION

Compression enables storing, transmitting, and processing of videos with fewer storage, network, and processor resources. The most widely used video compression standards include MPEG-1 for storage and retrieval of moving pictures, MPEG-2 for digital television, and H.263 for video conferencing, see ISO/IEC 11172-2:1993, *"Information Technology—Coding of Moving Pictures and Associated Audio for Digital Storage Media up to about 1.5 Mbit/s—Part 2: Video,"* D. LeGall, *"MPEG: A Video Compression Standard for Multimedia Applications,"* Communications of the ACM, Vol. 34, No. 4, pp. 46-58, 1991, ISO/IEC 13818-2: 1996, *"Information Technology—Generic Coding of Moving Pictures and Associated Audio Information—Part 2: Video,"* 1994, ITU-T SG XV, DRAFT H.263, *"Video Coding for Low Bitrate Communication,"* 1996, and ITU-T SG XVI, DRAFT13 H.263+Q15-A-60 rev.0, *"Video Coding for Low Bitrate Communication,"* 1997.

These standards are relatively low-level specifications that deal primarily with spatial compression of images or frames, and the spatial and temporal compression of a sequence of frames. As a common feature, these standards perform compression on a per frame basis. These standards achieve high compression ratios for a wide range of applications.

Video coding standards, such as MPEG-4 for multimedia applications provide several new coding tools, including tools to improve the coding efficiency, and tools that support object-based coding and error-resilience, see ISO/IEC 14496-2:1999, *"Information technology—coding of audio/visual objects, Part 2: Visual."*

One of the main problems in delivering video content over networks is adapting the content to meet particular constraints imposed by users, networks and devices. Users require playback with minimal variation in perceived quality. However, dynamic network conditions often make this difficult to achieve.

Fine granular scalable (FGS) coding has been adopted by the MPEG-4 standard. The tools that support FGS coding are specified in an amendment of the MPEG-4 standard, *"ISO/IEC 14496-2:1999/FDAM4, "Information technology—coding of audio/visual objects, Part 2: Visual."* An overview of FGS coding is described by Li in *"Overview of Fine Granularity Scalability in MPEG-4 video standard,"* IEEE Trans. Circuits and Systems for Video Technology, March 2001.

FGS coding is a radical departure from traditional scalable coding. With traditional scalable coding, the video is coded into a base layer bitstream and possibly several enhancement layer bitstreams, where the granularity is only as fine as the number of enhancement layer bitstreams that are formed. The resulting rate-distortion (R-D) curve resembles a step-like function.

In contrast, FGS coding provides an enhancement layer bitstream that is continuously scalable. Providing a continuous scalable enhancement layer bitstream is accomplished by a bit-plane coding method that uses discrete cosine transform (DCT) coefficients. Bit-plane coding allows the enhancement layer bitstream to be truncated at any point. In that way, the quality of the reconstructed video is proportional to the number of decoded bits of the enhancement layer bitstream.

FIG. 1 shows a conventional FGS encoder including a base layer encoder 102 and an enhancement layer encoder 101. An input video 103 is provided to a typical base layer encoder. The base layer encoder includes DCT 110, Quantization (Q) 120, motion compensation (MC) 130, inverse quantization ($Q^{-1}$) 140, inverse DCT (IDCT) 150, motion estimation 160 with motion vectors 161, clipping 170, frame memory 180, and variable length coder (VLC) 190 components. The output of the base layer encoder is a base layer bitstream 104 having some predetermined minimum constant bit-rate (CBR). Typically, the CBR is very low, for example, 20 Kbps or less. Thus, the base layer bitstream 104 can be transmitted over high and low bandwidth channels.

An enhancement layer bitstream 105 is generated by subtracting reconstructed frames of the base layer bitstream 103 from the input video. This yields an FGS residual signal in the spatial domain. Enhancement layer encoding is then applied to the residual signal. The enhancement encoder 101 includes a DCT 190, followed by bit-plane shifting 192, a maximum operation 194, and bit-plane VLC coding 196 to produce the enhancement layer bitstream 105.

FIG. 2 shows a FGS decoder including a base layer decoder 201 and an enhancement layer decoder 202 that are applied respectively to the base layer bitstream 104 and the enhancement layer bitstream 105 to produce a reconstructed a base layer bitstream 291 and a reconstructed enhancement layer bitstream 292. The decoder includes a variable length decoder (VLD) 210, inverse quantizer 220, inverse DCT 230, motion compensation 240, frame memory 250. The FGS residual signal 292 is reconstructed by passing the enhancement layer bitstream 105 through bit-plane VLD 260, bit-plane shift 270 and IDCT 280 components. The FGS residual signal 292 can then be added to the reconstructed base layer bitstream 291 to yield the enhancement video 293. The combined signal 293 is clipped to ensure that the signal is bounded, i.e., 8-bit pixels values are in the range [0, 255].

A selective enhancement method to control the bit-plane shifting in the enhancement layer bitstream of the FGS coded video bitstream was described in U.S. Pat. No. 6,263,022, *"System and method for fine granular scalable video with selective quality enhancement,"* issued on Jul. 17, 2001 to Chen, et al. There, the quantization parameter used for coding the base layer video also determined the corresponding shifting factor. The bit-planes associated with macroblocks that were deemed more visually important were shifted higher.

A key point to note is that the bit rate of the base layer bitstream is some predetermined minimum. The enhancement layer bitstream covers the range of rates and distortions from a minimum to near lossless reconstruction. Also, after the enhancement layer bitstream has been generated, it can be stored and re-used many times. According to e.g., network characteristics, an appropriate number of bits can be allocated to a frame and transmitted over the network, taking into consideration current network conditions. It is important to note however that there is no quantization parameter to adjust in that scheme.

The MPEG-4 standard does not specify how rate allocation, or equivalently, the truncation of bits on a per frame basis is to be done. The standard only specifies how the scalable bitstream is decoded. Additionally, traditional methods that have been used to model the rate-distortion characteristics, e.g., methods based on quantization parameters, no longer hold with a bit-plane coding scheme used by the FGS coding. As a result the perceived quality of the reconstructed video can vary noticeably.

Because differential sensitivity is key to human visual perception, it is important to minimize the variation in the perceived quality rather than overall distortion. Optimal rate allocation can be done by minimizing a cost according to an exponential R-D model. This leads to a constant quality among the decoded frames, see Wang, et al., "A new rate allocation scheme for progressive fine granular scalable coding," Proc. International Symposium on Circuits and Systems, 2001. However, the prior art rate allocation methods typically use exhaustive searches not suitable for real-time applications, and do not work on low bit-rate signals. In U.S. patent application Ser. No. 09/961,987, "Transcoder for Scalable Multi-Layer Constant Quality Video Bitstreams," filed on Sep. 24, 2001 by Zhang, et al., an FGS-based transcoder that extracts R-D labeling points has been described to provide an output bitstream that has a constant quality.

The FGS coding method and rate allocation techniques described above are useful for transmission over dynamic channels. The key assumption made is that the receiving device has a decoder that can process both base and enhancement layer bitstreams. In practice, this may not always be true, especially for today's low-power mobile devices, such as cellular telephones and personal digital assistants (PDAs).

The only existing way to overcome this problem is to simply transmit the base layer bitstream to the receiving device. The main drawback of that approach is that the base layer bitstream is usually coded with a minimum constant bit-rate resulting in a very low quality decoded video. Therefore, if there is additional bandwidth available, then the connection and the device capabilities are under-utilized. In order to convert the FGS coded video to a single layer bitstream with higher quality than the base layer bitstream only, some other means of transcoding is required.

As shown in FIG. 3a, this can be accomplished by a transcoder 300. In a simplest implementation, the transcoder includes an FGS decoder, including a base layer decoder 320, an enhancement layer decoder 310, an adder 330, and a single layer encoder 340. An input compressed base layer bitstream 301 and a compressed FGS enhancement layer bitstream 302 are fully decoded, then re-encoded to a single layer bitstream 303 with output bit-rate $R_{out}$. Usually, the output rate is lower than the input rate. In practice, full decoding and full encoding in a transcoder is not done due to the high complexity of encoding the decoded bitstream. The detailed operation of this transcoder 300 is shown in FIG. 3b where the components function as described above for FIGS. 1 and 2.

A prior art method for transcoding and scaling a bitstream has been described by Sun et al., in "Architectures for MPEG compressed bitstream scaling," IEEE Transactions on Circuits and Systems for Video Technology, April 1996. There, four methods of rate reduction, with varying complexity and architecture, were described.

FIG. 4 shows one example method. That method is referred to as a single layer, closed-loop architecture. In that method, an input video bitstream 401 is partially decoded, i.e., macroblocks of the input bitstream are variable-length decoded (VLD) 410, and inverse quantized with $Q_1$ 420 to yield discrete cosine transform (DCT) coefficients. Correction DCT coefficients are added 440 to the incoming DCT coefficients to compensate for the mismatch produced by re-quantization. That correction improves the quality of the reference frames that will eventually be used for decoding. After the correction has been added, the newly formed blocks are re-quantized with $Q_2$ 450 to satisfy a new rate, and variable-length coded 460.

To obtain the correction DCT coefficients 430, the re-quantized DCT coefficients are inverse quantized 470 and subtracted 480 from the original partially decoded DCT coefficients. That difference is transformed to the spatial domain via an inverse DCT (IDCT) 490 and stored into a frame memory 495. The motion vectors associated with each incoming block are then used to recall the corresponding difference blocks, such as in motion compensation 496. The corresponding blocks are then transformed via the DCT 430 to yield the correction component. A derivation of the method shown in FIG. 4 is described in "A frequency domain video transcoder for dynamic bit-rate reduction of MPEG-2 bitstreams," by Assuncao et al., IEEE Transactions on Circuits and Systems for Video Technology, pp. 953-957, 1998.

Assuncao et al. also described an alternate method for the same task. In the alternative method, they used a motion compensation (MC) loop operating in the frequency domain for drift compensation. Approximate matrices were derived for fast computation of the MC blocks in the frequency domain. A Lagrangian optimization was used to calculate the best quantizer scales for transcoding. That alternative method removed the need for the IDCT/DCT components.

The prior art clearly teaches methods of transcoding compressed single layer bitstreams for bit-rate reduction. However, the prior art does not teach a method of transcoding a multi-layer bitstream to a single layer stream. In particular, there is a need for efficient transcoding methods that convert the multi-layer bitstream consisting of a base and FGS enhancement layers to a single layer bitstream with a higher quality than the base layer bitstream.

SUMMARY OF THE INVENTION

A method transcodes a compressed multi-layer video bitstream that includes a base layer bitstream and an enhancement layer bitstream. The base and enhancement layers are first partially decoded, and then the partially decoded signals are combined with a motion compensated signal yielding a combined signal.

The combined signal is quantized into an output signal according to a quantization parameter, and the output signal is variable length encoded as a single layer bitstream. In a pre-processing step, the enhancement layer can be truncated according to rate control constraint, and the same constraints can also be used during the quantization.

DETAILED DESCRIPTION OF PREFERRED EMBODIMENTS

Introduction

The present invention provides a system and method for transcoding a compressed multi-layer video bitstream, such as an FGS coded video bitstream, to a single layer bitstream. The transcoding according to the invention enables devices that only support single layer decoding to receive a higher quality video than produced by only decoding a base layer bitstream of the multi-layer bitstream.

Transcoding Architecture

Figure 1:
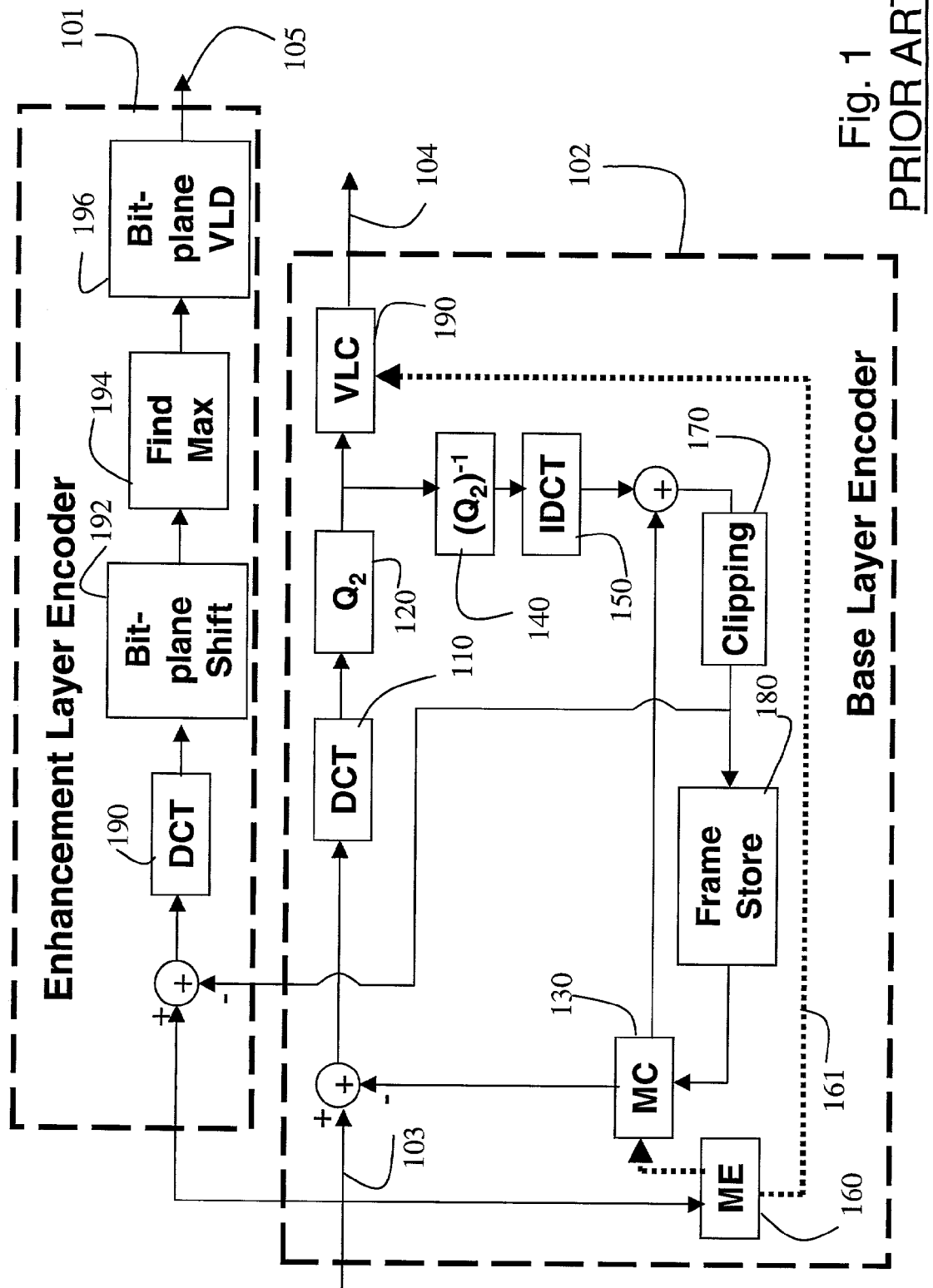
FIG. 1 is a block diagram of a prior art fine granular scalable (FGS) encoder.
Figure 2:
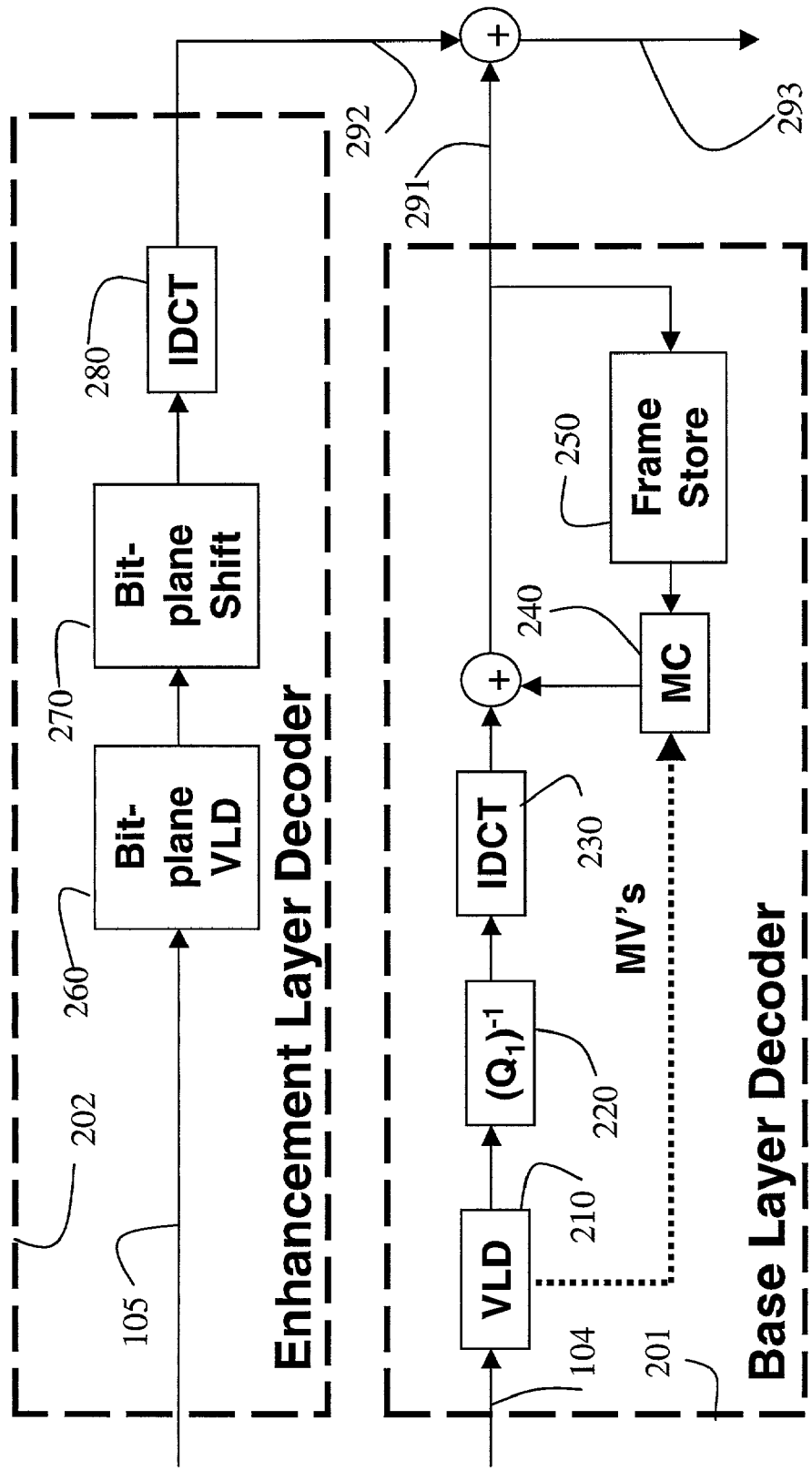
FIG. 2 is a block diagram of a prior art FGS decoder.
Figure 3A:
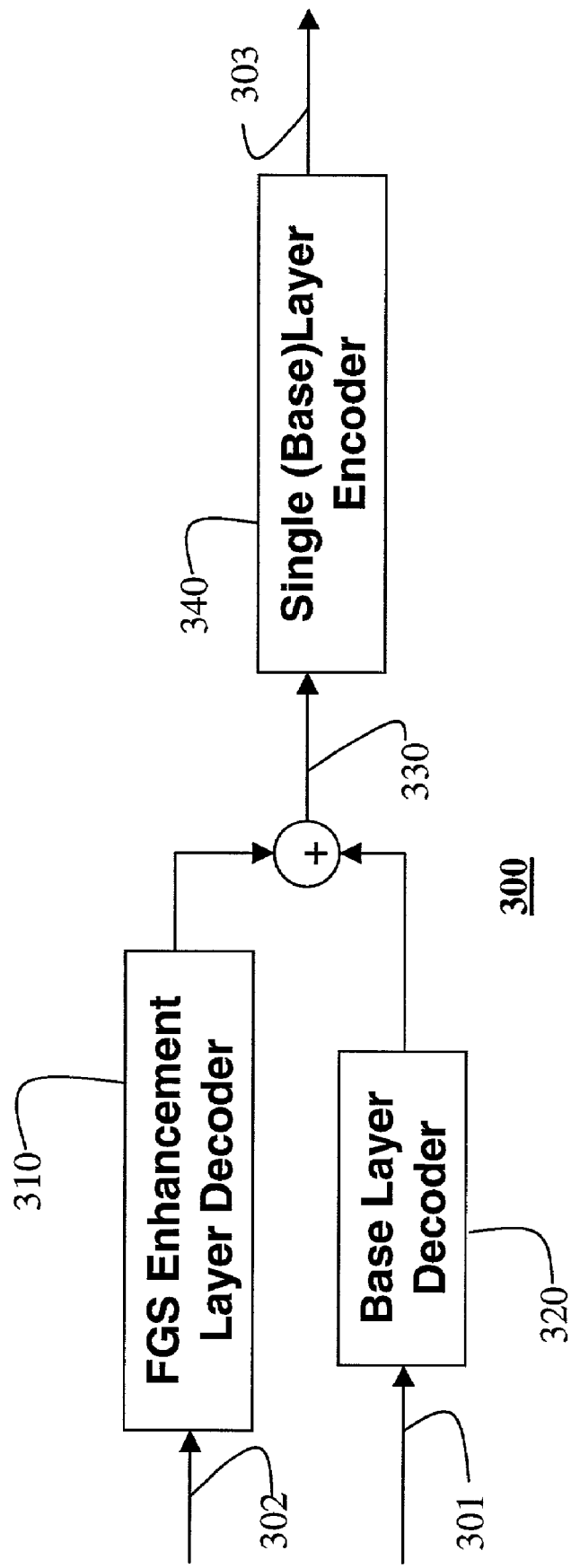
FIG. 3a is a high-level block diagram of a prior art multi-layer bitstream to single layer bitstream transcoder.
Figure 3B:
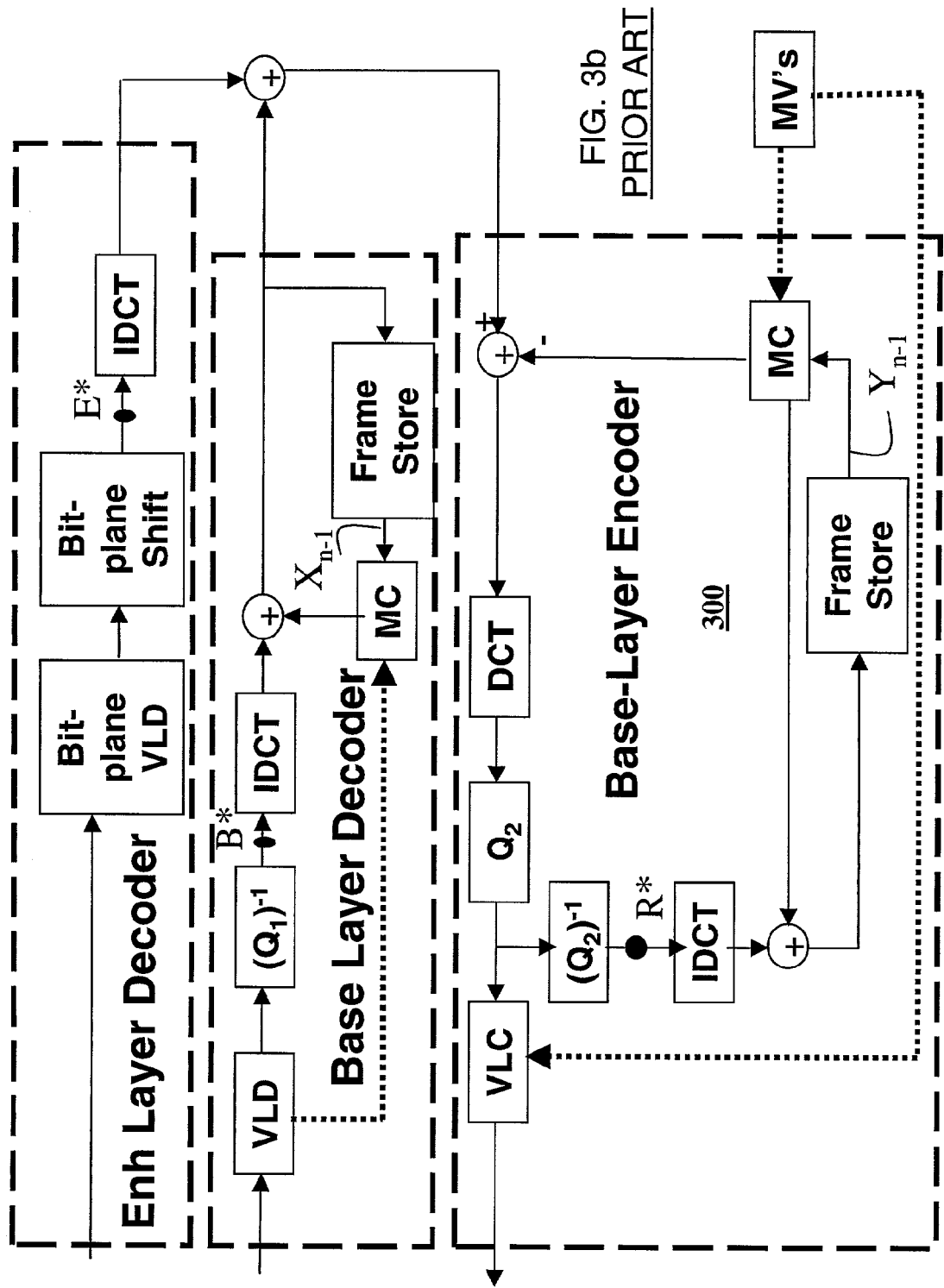
FIG. 3b is a low-level block diagram of a prior art multi-layer to single layer bitstream transcoder.
Figure 4:
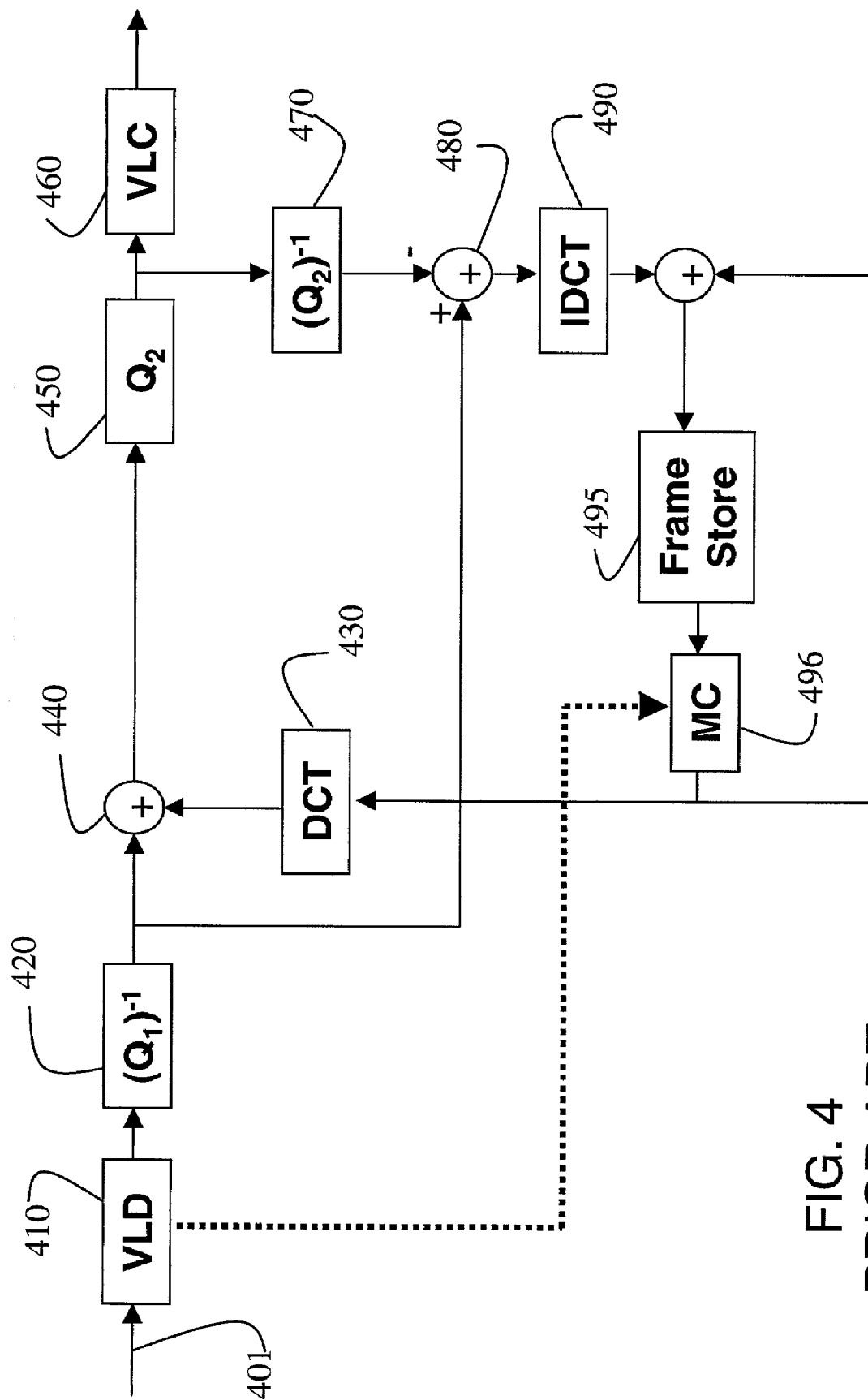
FIG. 4 is a block diagram if a prior art single layer transcoder for bit-rate reduction.
Figure 5:
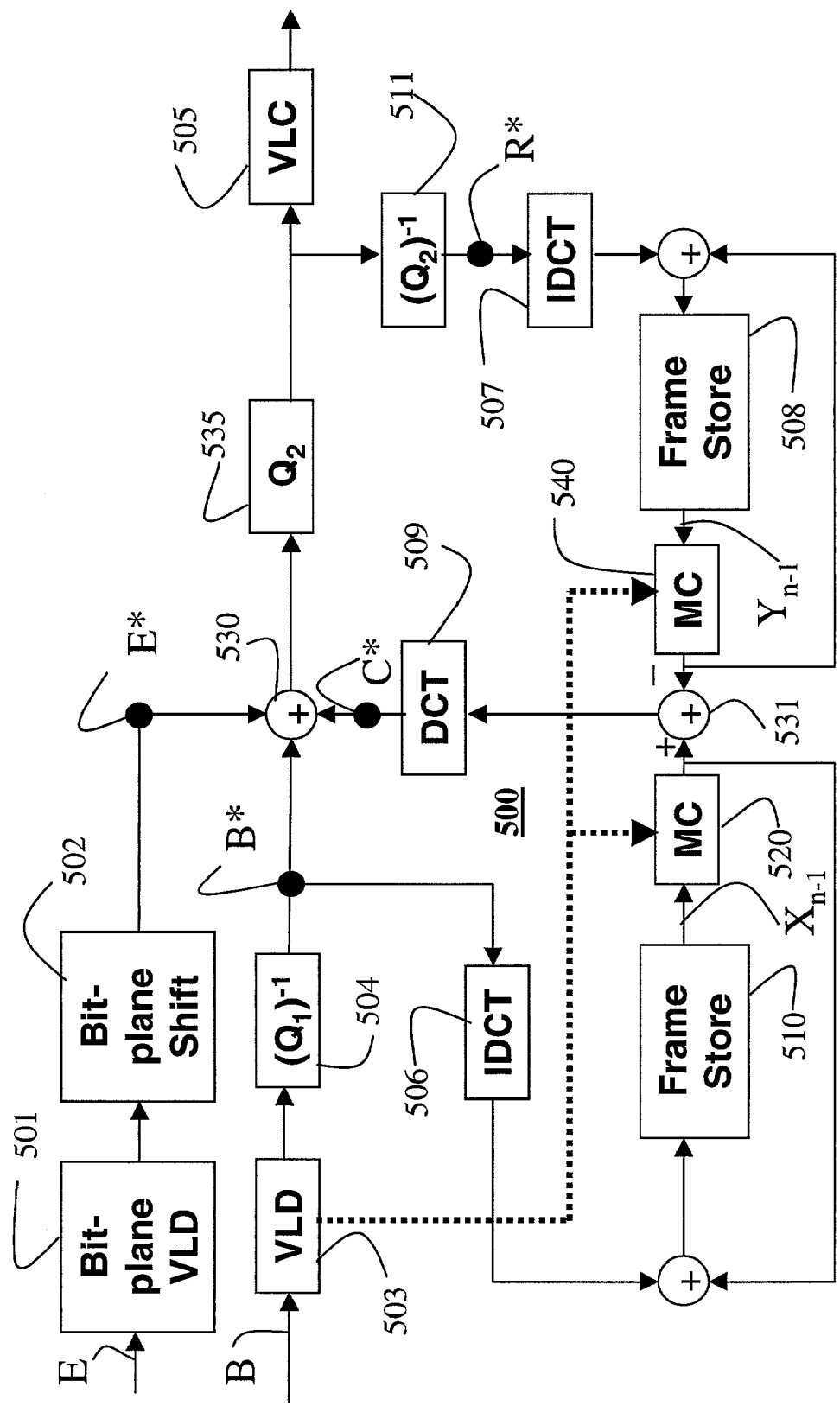
FIG. 5 is a block diagram of an intermediate architecture for transcoding a multi-layer bitstream to single layer bitstream.

FIG. 5 shows an intermediate architecture of a multi-layer to single layer transcoder 500. The multi-layer to single layer transcoder 500 is a simplified version of the reference transcoder 300 shown in FIGS. 3*a-b* with essentially the same functionality. This architecture is shown for the purpose of developing the idea of the invention. The transcoder includes bit plane VLD 501, bit plane shift 502, VLD 503, inverse quantizer 504 and 511, VLC 505, IDCT 506-507, frame stores 508 and 510, MCs 520 and 540, adders 530 and 531, and DCT 509 components.

If $X_{n-1}$ represents the reconstructed reference frame in the base layer decoder that is stored in frame store 510 at frame n, then the prediction residual of a next P-frame $X_n$ is defined as, $$\Delta X_n = X_n - MC(X_{n-1}), \qquad (1)$$

where MC(.) denotes a motion compensation process.

In the DCT domain, this prediction residual is also expressed in terms of signals present in the base and enhancement layer decoders, $$DCT(\Delta X_n) = B^* + E^*, \qquad (2)$$

where $B^*$ and $E^*$ correspond to the DCT coefficients reconstructed from the base layer bitstream and enhancement layer bitstream, respectively.

In the base layer encoder, $R^*$ denotes the DCT coefficients reconstructed from the output bitstream, and $Y_{n-1}$ denotes the reconstructed reference frame in the base layer encoder that is stored in frame store 508. The DCT coefficients corresponding to $R^*$ are given by, $$R^* = DCT(X_n - MC(Y_{n-1})) + \Delta, \qquad (3)$$

where $\Delta$ denotes the quantization error induced by quantization 535 and inverse quantization 511. Substituting Equations (1) and (2) into (3) yields, $$\begin{aligned} R^* &= DCT(\Delta X_n + MC(X_{n-1}) - MC(Y_{n-1})) + \Delta \\ &= B^* + E^* + DCT(MC(X_{n-1}) - MC(Y_{n-1})) + \Delta \\ &= B^* + E^* + C^* + \Delta, \end{aligned} \qquad (4)$$

where $$C^* = DCT(MC(X_{n-1}) - MC(Y_{n-1})). \qquad (5)$$

Thus, the intermediate architecture shown in FIG. 5 equivalently implements Equation (4).

To simplify this intermediate architecture further, we assume that MC(.) is a linear operation, and expanding the definitions of $X_{n-1}$ and $Y_{n-1}$ according to FIG. 5, $C^*$ is subsequently expressed as follows, $$\begin{aligned} C^* &= DCT(MC(X_{n-1} - Y_{n-1})) \\ &= DCT(MC(X_{n-2} + IDCT(B^*_{n-1}) - (Y_{n-2} + IDCT(R^*_{n-1})))) \\ &= DCT(MC(X_{n-2} - Y_{n-2} + IDCT(B^*_{n-1} - R^*_{n-1}))) \end{aligned} \qquad (6)$$

Figure 6:
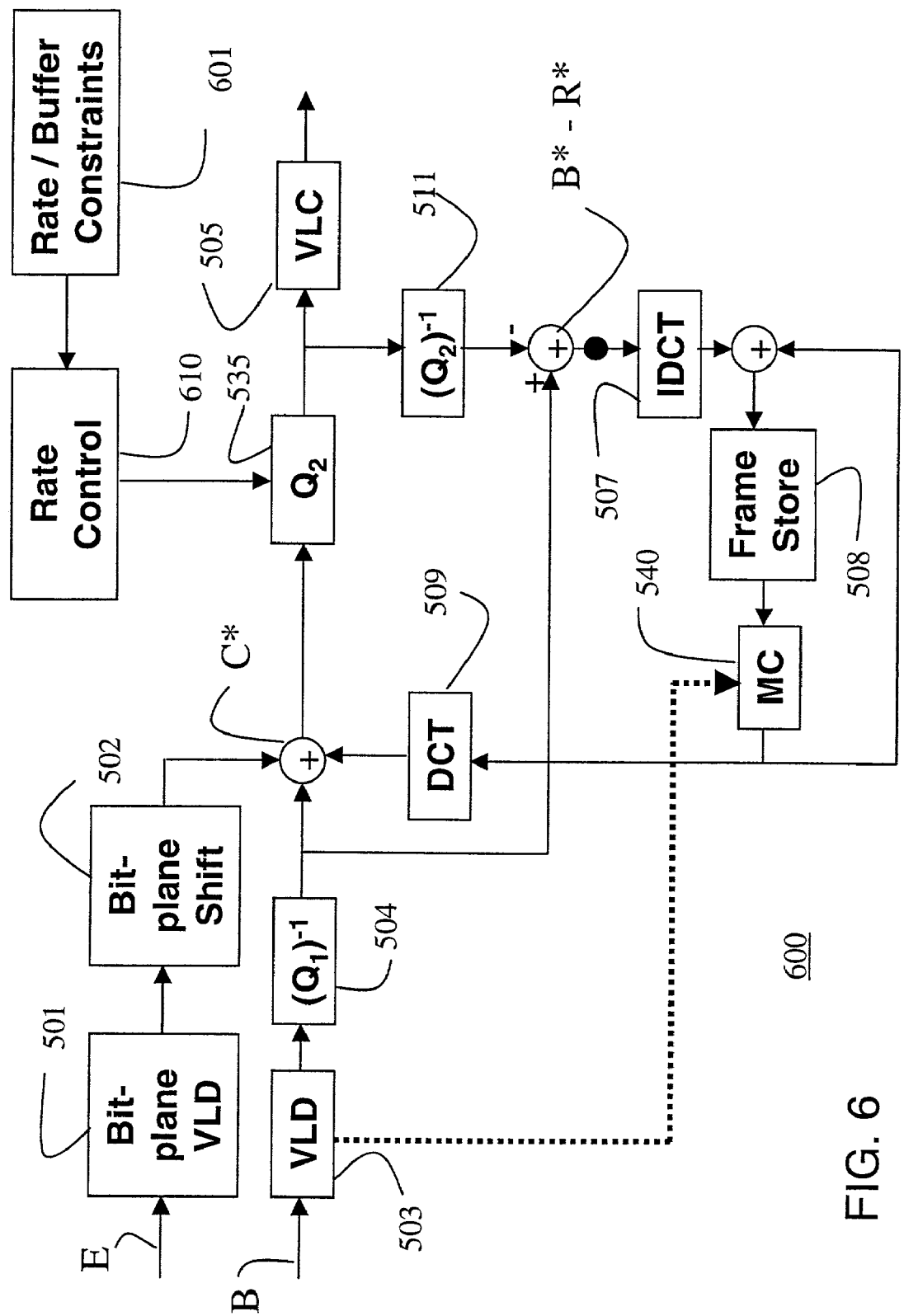
FIG. 6 is a block diagram of a first embodiment for a multi-layer to single layer transcoder with single rate control points according to the invention.

In order to transform transcoder 500 into a transcoder 600 according to the invention, as shown in FIG. 6, we first recognize from Equation (6) that frame stores 510 can be shared with frame store 508. Also, the motion compensation operation expressed in Equation (6) can be done after taking the frame difference, which can be performed in the DCT domain. Thus, Equation (4) can be reduced to, $$R^* = B^* + E^* + DCT(MC(IDCT(B^*_{n-1} - R^*_{n-1}))). \qquad (7)$$

Equation (7) equivalently represents the architecture illustrated in FIG. 6, with rate control module 610 added. The operation of the rate control 610 is performed based on given rate, buffer, and processing complexity constraints 601. These constraints can be acquired from a network and terminal devices connected to the network, as described in greater detail below.

Rate Controlled Encoding

To perform rate control as shown in FIG. 6, rate and buffer constraints 601 are provided as input to the rate control block 610 which is connected to $Q_2$ 535. Typically, these constraints are used in combination with picture statistics and a rate-quantizer model to determine an output quantization parameter, see for example, Chiang et al. "*A new rate control scheme using a quadratic rate-distortion modeling*," IEEE Trans. Circuits and Systems for Video Technology, February 1997. This process controls the output bit-rate of the transcoded stream and its corresponding picture quality.

Figure 7:
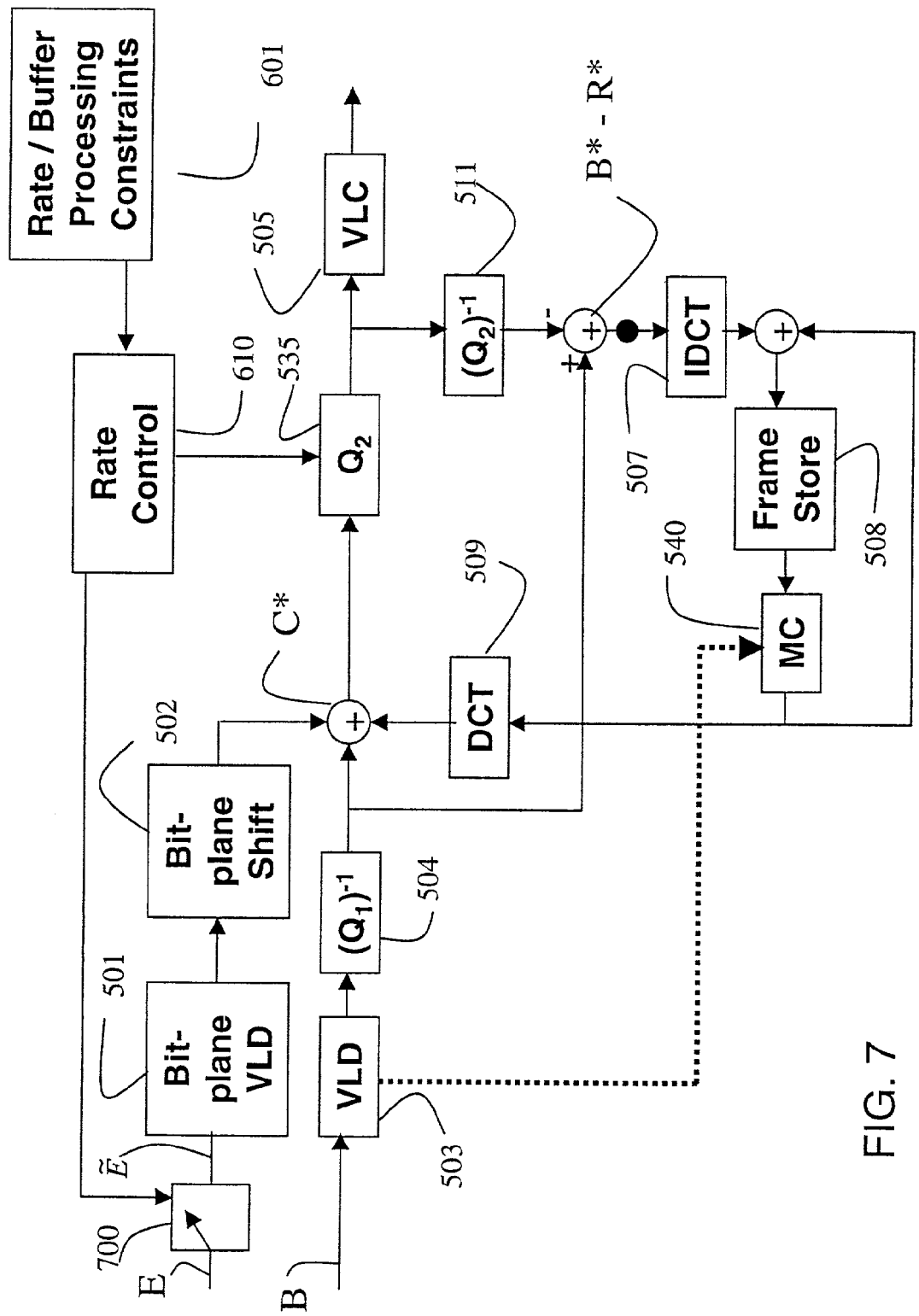
FIG. 7 is a block diagram of a second embodiment of a multi-layer to single layer transcoder with multiple rate control points according to the invention.

The transcoder shown in FIG. 7 further reduces the complexity of the processing that needs to be done while still maintaining a similar level of quality. Besides determining a suitable quantization parameter for each encoded frame, a means for reducing the processing and controlling the quality of the output bitstream is achieved by controlling the number of enhancement layer bits that are used to reconstruct the enhancement layer bitstream in the DCT-domain. This method exploits the fact that the enhancement layer bitstream is an embedded bitstream that is continually scalable. In this way, for a determined number of bit-planes, the processing associated with the bit-plane VLD and bit-plane shifting are avoided.

The same inputs to the rate control process are used, however rather than only selecting an output quantization parameter to control the bit-rate produced by the quantizer 535, the rate control is also jointly responsible for selecting the truncation point of the enhancement layer bitstream on a picture-by-picture basis using a switch 700. Truncating bit-plane data is similar to the process of quantization or smoothing, but with significantly less processing.

With the truncating operation, the enhancement layer signal, E* is modified to a lower quality signal. The new signal is denoted by Ẽ, and the transcoder shown in FIG. 7 with switch 700 can be expressed as, $$R^* = B^* + \tilde{E} + DCT(MC(IDCT(B^*_{n-1} - R^*_{n-1}))). \quad (8)$$

In most encoding and transcoding systems, the input signals are pre-processed to yield a more usable source for the quantization blocks. For example, the spectrum of the source can be lowpass filtered to remove information during the quantization process. However, this results in unpleasant blocking artifacts. Thus, a way of removing such information becomes important to achieve robust and efficient encoding and transcoding systems.

In many commercial encoders, the pre-processing is adjusted manually to achieve the best visual quality. In our case of a transcoder based on FGS, it is beneficial to select the important information based on bit-planes because the information has been organized in a prioritized way. Thus, the rate control process can select 700 the number of bit-planes that results in a source with lower entropy for compression. The number of bit-planes are selected such that the quality is slightly higher than the target simple profile quality. In this way, the transcoder can achieve a seamless pre-processing, which is not possible with prior art transcoding systems.

Application System

Figure 8:
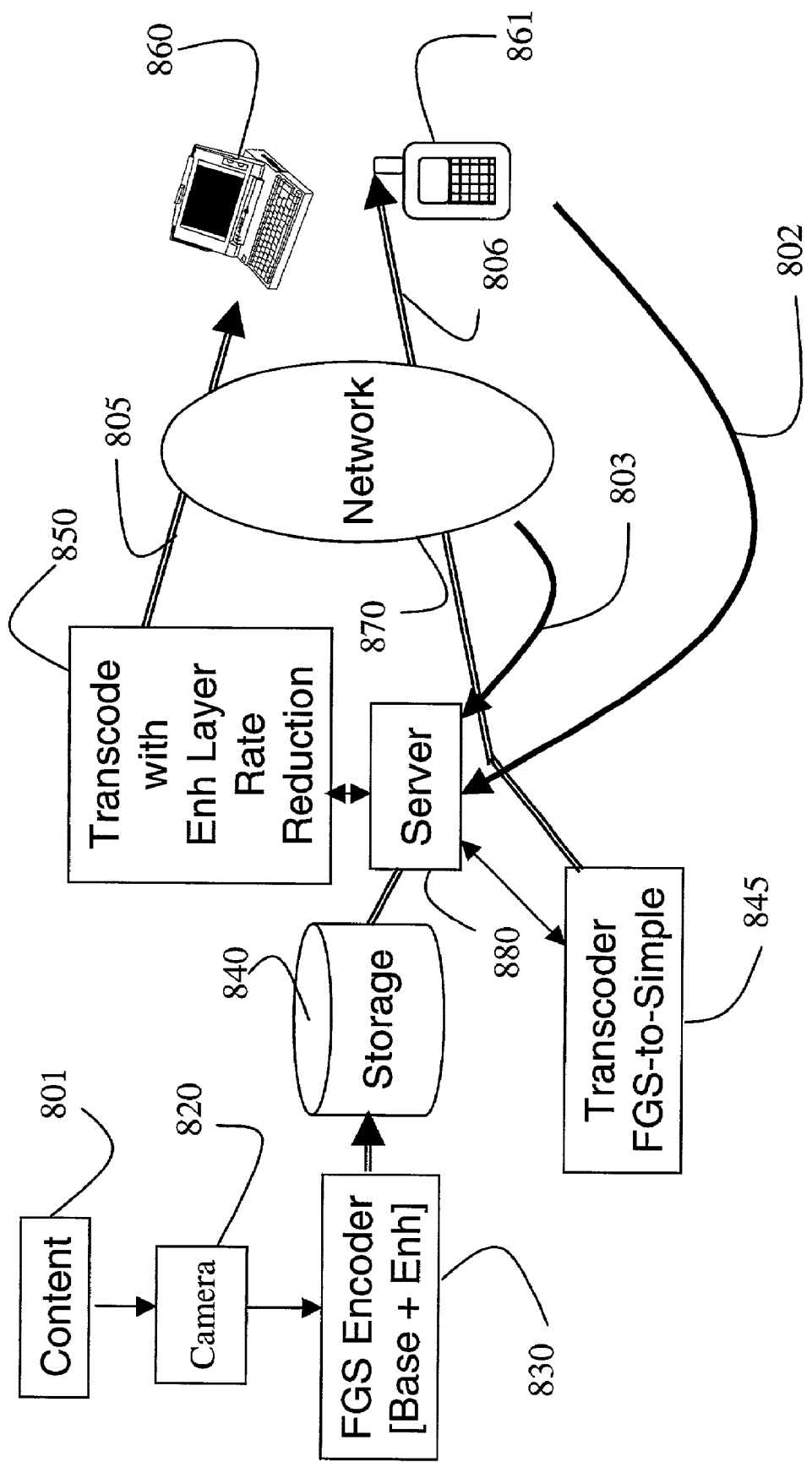
FIG. 8 is a flow diagram of an application system using the multi-layer to single layer transcoder according to the invention.

FIG. 8 shows an application system that is capable of providing access to FGS coded bitstreams to both FGS enabled devices and devices that only support MPEG-4 "simple profile," i.e., base layer bitstream only.

The system includes a camera 820 to acquire video content 801. The content is FGS encoded 830 and archived 840 as an FGS coded bitstreams to enable scalable video delivery 850 to devices 860 that support the FGS profile via a network 870. Terminal capabilities or constraints 802 are communicated to a server 880 to control format conversion, while network conditions 803 are used as input to the rate control at the server 880.

For devices that support FGS profile, the server 880 truncates 850 the enhancement layer bitstream 805 in order to adapt to a variable transmission rate. However, for devices 861 that only provide support for simple profile, the FGS bitstreams is transcoded 845 to an FGS to simple profile bitstream 806.

Because the FGS enhancement layer bitstream can be truncated at any location, the reconstructed video quality is proportional to the number of bits actually decoded. Thus, with the enhancement video, the supplied quality is higher than that of traditional single layer bitstream transcoding methods.

The described FGS-to-simple transcoding according to the invention has substantially the same performance as the cascaded transcoding methods but with much less processing.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for transcoding a compressed multi-layer video bitstream, comprising:
    receiving, in a multi-layer to single-layer fine granular scalable transcoder, a compressed multi-layer video bitstream including a base layer and an enhancement layer;
    partially decoding the base layer;
    partially decoding the enhancement layer;
    combining, in the DCT domain, the partially decoded base layer and the partially decoded enhancement layer with a motion compensated signal yielding a partially decoded combined signal;
    quantizing the partially decoded combined signal into an output signal according to a quantization parameter;
    inverse quantizing the output signal to yield a reconstructed partially decoded combined signal;
    determining a difference between the partially decoded base layer and the reconstructed partially decoded combined signal;
    generating the motion compensation signal using the difference; and
    variable length encoding the output signal as a single layer bitstream.

2. The method of claim 1 wherein the quantization parameter is determined according to constraints and data extracted from the compressed multi-layer video bitstream.

3. The method of claim 2 wherein the constraints include rate control constraints.

4. The method of claim 3 wherein the rate control constraints are acquired from a network transporting the single layer bitstream.

5. The method of claim 2 wherein the constraints include buffer constraints.

6. The method of claim 5 wherein the buffer constraints are acquired from a device receiving the single layer bitstream.

7. The method of claim 2 wherein the constraints include complexity constraints including system processing load.

8. An apparatus for transcoding a compressed multi-layer video bitstream, comprising:
    a multi-layer to single-layer fine granular scalable transcoder configured to receive a compressed multi-layer video bitstream including a base layer and an enhancement layer, the transcoder further comprising;
    means for partially decoding the base layer;
    means for partially decoding the enhancement layer;
    means for combining, in the DCT domain, the partially decoded base layer and the partially decoded enhancement layer with a motion compensated signal yielding a partially decoded combined signal;
    means for quantizing the partially decoded combined signal into an output signal according to a quantization parameter;
    means for inverse quantizing the output signal to yield a reconstructed partially decoded combined signal;
    means for determining a difference between the partially decoded base layer and the reconstructed partially decoded combined signal;
    means for generating the motion compensation signal using the difference; and
    means for variable length encoding the output signal as a single layer bitstream.

* * * * *